United States Patent [19]

Reighter

[11] 4,126,598
[45] Nov. 21, 1978

[54] CONCRETE ELECTRICAL INSULATOR

[75] Inventor: David H. Reighter, Roslyn, Pa.

[73] Assignee: Gould Inc., Rolling Meadows, Ill.

[21] Appl. No.: 818,582

[22] Filed: Jul. 25, 1977

Related U.S. Application Data

[62] Division of Ser. No. 679,056, Apr. 21, 1976, abandoned.

[51] Int. Cl.$^2$ .............................................. C08H 0/00
[52] U.S. Cl. .................................. 260/37 EP; 106/90; 252/63.7
[58] Field of Search ..................... 106/90, 97; 260/29.2 EP, 37 EP; 427/294, 350, 386; 428/446, 538; 252/63.7, 64

[56] References Cited

U.S. PATENT DOCUMENTS

| | | | |
|---|---|---|---|
| 2,880,116 | 3/1959 | Alps et al. | 427/386 |
| 3,798,191 | 3/1974 | Donnelly | 260/37 EP |
| 3,830,776 | 8/1974 | Carlson et al. | 260/37 EP |
| 3,850,661 | 11/1974 | Dreher et al. | 427/386 |
| 3,867,385 | 2/1975 | Habermeier et al. | 260/37 EP |
| 3,922,413 | 11/1975 | Reineman | 428/538 |
| 3,941,607 | 3/1976 | Schuhbauer et al. | 260/37 EP |
| 3,980,604 | 9/1976 | Whiting et al. | 260/37 EP |
| 3,988,279 | 10/1976 | Klassen | 106/90 |

*Primary Examiner*—James Poer
*Attorney, Agent, or Firm*—Ostrolenk, Faber, Gerb & Soffen

[57] ABSTRACT

An improved electrical grade concrete insulator is prepared from a mixture of aggregate, a hydantoin epoxy resin and, optionally, cement.

9 Claims, No Drawings

CONCRETE ELECTRICAL INSULATOR

This is a division of application Ser. No. 679,056, filed Apr. 21, 1976, now abandoned.

BACKGROUND OF THE INVENTION

There has been sporadic interest in cement concrete as electrical insulator since about 1952. Recently, this interest has quickened mainly due to economic pressures brought about by the rise in cost of conventional porcelain and epoxy insulators.

Concrete is a mixture of an aggregate and a binder which can be cement or a polymer, or both. A major problem in the use of concrete as an electrical insulator is the difficulty in constructing an insulator which has sufficient resistance to high humidity. It has been found that moisture is a single most deleterious component which affects the electrical properties of a polymer containing concrete. Even a seemingly insignificant amount of residual moisture, i.e., about 0.2% or less, can adversely effect the electrical properties.

It is the object of this invention to provide a polymer containing electrical insulation grade concrete in which the adverse effect of residual moisture has been greatly minimized. This and other objects of the invention will become apparent to those skilled in the art from the following detailed description.

SUMMARY OF THE INVENTION

This invention relates to an improved, polymer containing, electrical insulation grade concrete for indoor and outdoor use on electrical power systems. The concrete is prepared from a mixture of aggregate, hydantoin epoxy resin and, optionally, cement.

DESCRIPTION OF THE PREFERRED EMBODIMENT

The electrical insulation grade concrete of the present invention is a mixture of aggregate and a binder, the latter being a hydantoin epoxy resin or a mixture of a hydantoin epoxy resin and cement.

The aggregate employed is that normally used in preparing concrete and is thus a conglomeration of broken stone, gravel, pebbles, glass-furnace slag or cinders, ceramics, sand and the like. Crushed electrical grade porcelain forms an excellent aggregate. The conglomeration of materials forming the aggregate should have a variety of particle sizes to reduce the amount of volume which will be filled by the binder portion of the concrete.

The binder portion of the concrete is a curable hydantoin epoxy resin or a mixture of the curable hydantoin epoxy resin and cement. The cements employed are those normally used in preparing concrete and thus, for example, either Portland cement or aluminous cement or mixtures thereof can be used. The particular cement employed will be chosen on the basis of the particular end use application contemplated and it is, of course, preferred to use a cement which has a minimum amount of electrically conductive material within it.

The polymer employed in this invention is a hydantoin epoxy resin. Hydantoin is a five membered heterocyclic ring compound containing two nitrogens which is manufactured readily from ketones, hydrogen cyanide, ammonia, carbon dioxide and water. In forming epoxy resins, the hydantoin is usually di-substituted at the five position with alkyl groups and most often with lower alkyl groups. A great variety of epoxy resins can be formed through the reaction of hydantoin with epichlorohydrin. For example, hydantoin rings can be linked together to form an extended resin analagous in structure to bisphenol A. Polyfunctional resins can also be formed from these chain extended materials by glycidylization of the hydroxyl groups and the remaining nitrogen. Epoxy resins can also be formed by forming an adduct of, i.e., dimethyl hydantoin and bisphenol A.

The hydantoin epoxy resins which can be used in this invention are commercially available. For example, several resins based on dimethyl hydantoin are available from Ciba-Geigy under the trademark Aracast. To be useful in this invention, the hydantoin epoxy resin used must be sufficiently polar as to be soluble in water. The resin should also have a sufficiently low viscosity for more convenient handling and the viscosity should preferably be less than 12,000 centipoises and most preferably less than about 5,000 centipoises. The resin is preferably curable at other than ambient conditions. The epoxy resins can be cured with conventional epoxy curing agents such as anhydrides, aromatic and aliphatic amines and novalacs and with conventional epoxy resin catalysts.

When the concrete is prepared from aggregate and the hydantoin epoxy resin as binder, the binder is generally employed in an amount of about 10 to 20% by weight based on the total weight of binder and aggregate. It will be understood that the binder contains the hydantoin epoxy resin, curing agent, catalyst and, if desired, a mineral filler such as silica. It is preferred to use about 90 to 140, preferably about 105 to 125, parts by weight of hardener per 100 parts of hydantoin epoxy resin and about 0.1 to 1.5, preferably about 0.25 to 0.75, parts by weight of catalyst per 100 parts of epoxy resin.

The concrete of this invention can be prepared by merely mixing the aggregate and binder together in the conventional manner under vacuum to exclude air entrainment and then heating the mixture in order to initiate curing.

In a preferred embodiment, the epoxy resin is used to impregnate a cement-aggregate concrete. In this procedure, the cement and aggregate are mixed in the conventional manner and then, preferably, the mixture can be vacuum deaerated and vacuum dehydrated by the method described in co-pending application Ser. No. 595,176, filed July 11, 1975. The concrete is then allowed to cure at 100% relative humidity until the mixture is self-supporting and then dried to remove at least about 99% of the residual water in an oven. It is preferred to employ a microwave oven for the drying because this substantially reduces the amount of time necessary for this step. However, when employing a microwave oven, it is important that the curing of the concrete does not exceed the point equivalent to a 36 hour cure at room temperature and 100% relative humidity because it has been found if the concrete is too far advanced in its set, the concrete body will explode. As the concrete cures, the pore size distribution changes although total porosity remains constant. Since the size of the capillaries in the mixture diminishes as the curing progresses, it becomes more difficult for the water in the form of steam to escape from the body. The steam pressures can then build up to the point where the body will explode. It will be recognized that the intensity of the microwave energy must be selected in accordance with the size of the body but once this has been established, drying proceeds efficiently with a great saving in time and energy.

After the drying, hydantoin impregnation is effected. It is preferred that this impregnation be carried out using a vacuum impregnation followed by pressure impregnation. In other words, initially a suitable vacuum is established, preferably greater than about 25 mm of mercury, most preferably about 0.5 to 1.5 mm Hg, and then the hydantoin epoxy resin with hardener and catalyst is introduced into the vacuum chamber. Impregnation is allowed to continue for a period of time which can range up to about 4 hours, depending on size, although longer vacuum impregnation times can be used if desired. Preferably the vacuum impregnation is carried out for about 2 hours. Thereafter, the vacuum is released and the chamber is pressurized for an additional period of time which can be up to 4 hours or longer and is preferably about 1 to 2 hours. Any convenient pressure can be used and it is preferred to employ a pressure of about 60 to 100 psi, most preferably about 75 to 85 psi. The impregnation cycle can be effected at any temperature below that at which the epoxy resin will gel or cure. It is preferred to employ an elevated temperature of up to about 75° C., and most preferably about 65° C., in order to reduce the viscosity of the hydantoin epoxy resin and thus facilitate handling and impregnation of the resin.

After completion of the impregnation, the impregnated concrete is then heated to a temperature sufficient to cure the epoxy resin. This curing is best accomplished in a bath of hot epoxy resin without curing agents. This procedure allows a secondary impregnation that seals any porosity occasioned by the shrinkage of the impregnation resin during its cure, and is the subject of my co-pending application Ser. No. 679,057. The temperature is generally in the range of about 80° to 200° C. In order to shorten the amount of time necessary for complete cure, it is preferred to employ a temperature of about 130°–160° C.

The use of the hydantoin epoxy resins provide numerous advantages in the preparation of the polymer containing concrete. The hydantoin resin acts as a water scavenger and, as noted above, the presence of water in the concrete is the most serious problem in obtaining good electrical properties. It has also been found that the use of the hydantoin resin as an impregnant results in a better, more uniform impregnation than obtained with other types of epoxy resins due to its highly polar nature. Indeed, it has been found that only with the hydantoin impregnated concrete could the manufactured piece be cut on a wet saw and the electrical properties measured immediately without an extended re-drying period.

In order to further illustrate the present invention, various examples are set forth below. Unless otherwise indicated, all temperatures are in degrees Centigrade and all parts and percentages are by weight throughout this Specification and claims.

EXAMPLE 1

850 parts of coarse crushed electrical grade porcelain (¼ inch), 294 parts of medium crushed electrical grade porcelain (1/32 inch), 100 parts of a hydantoin epoxy resin, 116 parts of methyl tetrahydrophthlic anhydride hardener, 216 parts of silica (325 mesh) and 0.5 benzyldimethylamine catalyst were mixed at 55° C. and introduced into a mold. The mold was then vibrated for two minutes, to densify and express air, followed by heating at 80° C. for 3.25 hours in order to gell the resin. Thereafter, the concrete body was cured at 149° C. for 4 hours. The resulting electrical insulation grade concrete was then coated with a polyurethane resin.

The properties of the concrete were then determined. It was found to have a compressive strength (ASTM C-39) of 27,000 psi; a tensile strength (ASTM C-496) of 2500 psi, a flexural strength (ASTM D-790) of 5100 psi, an arc resistance (ASTM D-495) of 262 seconds, a heat distortion of 0.003 inch at 264 psi fiber stress at 150° C. (ASTM D-648), a dissipation factor (% tan δ) at 25° of 1.5 and a dielectric constant of 4.2 at 25° C. The linear coefficient of thermal expansion over the temperature range of minus 40° C. to plus 105° C. was found to be 11 × $10^{-6}$ in/in/° C. The long term heat deflection at 130° C. and 264 psi fiber stress was found to be 0.004 inch after 4 hours and 0.015 inch after 24 hours. Flammability was measured in accordance with ASTM D-225; it was found that the ignition time was 131 seconds, and the burn time was 140 seconds.

The hydantoin epoxy resin used in this Example was Aracast XB 2973 which is a low viscosity (1500–2500 cps) di-functional epoxy resin made from 5,5-dimethyl hydantoin.

EXAMPLE 2

250 parts of white Portland cement, 510 parts of coarse crushed (¼ inch) electrical grade porcelain, 176 parts of medium size (1/32 nd inch) electrical grade porcelain and 165 parts of water were mixed and then vacuum deaerated and vacuum dehydrated by the method described in co-pending application Ser. No. 595,176, filed July 11, 1975. The resulting body was allowed to cure for 16 hours at room temperature and 100% relative humidity followed by drying for one hour in a microwave oven and then cooling to room temperature in a dessicator.

The cement concrete was then impregnated with 100 parts of epoxy resin (Aracast XB 2793 manufactured by Ciba), 116 parts of methyl tetrahydrophthlic anhydride hardener and 0.5 part of BDMA (benzyldimethylamine) catalyst. The concrete was placed in a chamber maintained at 66° C. and a vacuum of 10 mm Hg established. The resin was then introduced into the chamber. After one hour, the vacuum was released and air pressure of 80 psi established for two hours. The resulting polymer containing concrete contained 11.5% of the epoxy resin.

The resulting body was then immersed in a bath containing a high molecular weight bisphenol A epoxy resin without hardener which was maintained at 80° C. After 3.25 hours, the body was removed from the bath and placed in an oven at 140° C. for 4 hours. Thereafter, the body was vapor degreased and a supplemental surface coating of a polyurethane was applied by spray coating.

The properties of the resulting electrical insulator are set forth in the following table.

| PROPERTIES (TEST METHOD) | VALUE |
| --- | --- |
| Compressive Strength PSI (ASTM C-39) | 22,175 |
| Dielectric Strength VPM | 200 – 250 |
| Inclined Plane Track Test, Minutes | >1,200 |
| Dissipation Factor (% tan δ) at 25° C. | 3 |
| Dielectric Constant at 25° C. | 6 |
| Flexural Strength PSI (ASTM D-790) | 6,280 |
| Heat Distortion ° C (ASTM D-648) 264 PSI fiber stress | >150 |
| Arc Resistance, Seconds (ASTM D-495) | 200.6 |
| Flame Retardancy, Seconds (ASTM D-229) | |
|   Ignition | 131 |
|   Burn Time | 83 |

-continued

| PROPERTIES (TEST METHOD) | VALUE |
|---|---|
| Thermal Cycle −40° C to 25° C to +105° C | 10 cycles-acceptable |
| Long Term Heat Deflection - in/in at 264 PSI | |
| - at 115° C | <0.0015 |
| - at 130° C | <0.010 |
| - at 155° C * | <0.010 |
| - at 180° C ** | <0.010 |
| - at 200° C | failed by rupture |

* equivalent to class F insulation
** equivalent to class H insulation

EXAMPLE 3

The effect of temperature on the dielectric constant and the dissipation factor of the insulator produced in Example 2 was evaluated relative to the same properties of electrical insulation grade porcelain. It was found that over a temperature range of about 25 to 110° C., the dielectric constant at 60 Hz of the insulator of Example 2 was less than that of the porcelain. It was also found that the dissipation factor (Tan δ) at 60 Hz over a temperature range of about 25 to 95° C. of the insulator of Example 2 was slightly less than the porcelain.

EXAMPLE 4

Example 2 was repeated. The cement concrete was impregnated with a different Aracast hydantoin epoxy resin (XB 2826), to provide the electrical insulation grade concrete. The XB2826 resin is an intermediate viscosity (about 5,000 cps) epoxy resin based on a dimethyl hydantoin-bisphenol A adduct.

Various changes and modifications can be made in the process and products of this invention without departing from the spirit and scope thereof. The various embodiments set forth herein were for the purpose of further illustrating the invention, but were not intended to limit it.

I claim:

1. A mixture for preparing an improved electrical insulation grade concrete consisting essentially of aggregate and about 10–20% by weight based on the weight of the mixture of a binder consisting essentially of a water soluble, polar hydantoin epoxy resin.

2. The mixture of claim 1 wherein said binder consists essentially of said resin, about 90–140 parts per 100 parts resin of hardener therefor and about 0.1–1.5 parts per 100 parts resin of catalyst therefor, said binder being adapted to cure at other than ambient conditions.

3. The mixture of claim 2 wherein said epoxy resin, hardener and catalyst are adapted to cure at 200 to 400° F.

4. The mixture of claim 3 wherein said hardener is anhydride hardener.

5. An electrical insulation grade concrete insulator consisting essentially of a cured mixture of aggregate and about 10–20% by weight based on the weight of the mixture of a binder consisting essentially of a water soluble, polar hydantoin epoxy resin.

6. The mixture of claim 2 wherein said binder contains about 105–125 parts per 100 parts resin of hardener and about 0.25–0.75 part per 100 parts resin of catalyst.

7. The mixture of claim 2 wherein said aggregate is crushed electrical grade porcelain.

8. The mixture of claim 7 wherein said epoxy resin has a viscosity less than 12,000 centipoises.

9. The electrical insulation grade concrete insulator of claim 5 wherein said aggregate is crushed electrical grade porcelain, and wherein said binder consists essentially of a 5,5-di (lower alkyl) hydantoin epoxy resin having a viscosity of less than 12,000 centipoises, about 90–140 parts per 100 parts resin of hardener therefor and about 0.1–1.5 parts per 100 parts resin of catalyst therefor.

* * * * *